(12) United States Patent
Farajidana et al.

(10) Patent No.: US 8,780,817 B2
(45) Date of Patent: Jul. 15, 2014

(54) APPARATUS AND METHOD FOR REDUCING OVERHEAD FOR COMMUNICATIONS

(75) Inventors: Amir Farajidana, San Diego, CA (US); Juan Montojo, San Diego, CA (US); Kapil Bhattad, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 621 days.

(21) Appl. No.: 12/563,694

(22) Filed: Sep. 21, 2009

(65) Prior Publication Data

US 2010/0074208 A1   Mar. 25, 2010

Related U.S. Application Data

(60) Provisional application No. 61/099,029, filed on Sep. 22, 2008.

(51) Int. Cl.
| | |
|---|---|
| *H04W 72/00* | (2009.01) |
| *H04B 7/216* | (2006.01) |
| *H04W 4/00* | (2009.01) |
| *H04W 28/12* | (2009.01) |
| *H04L 1/18* | (2006.01) |
| *H04L 1/16* | (2006.01) |

(52) U.S. Cl.
CPC ........... *H04L 1/1621* (2013.01); *H04L 1/1812* (2013.01); *H04L 1/1867* (2013.01); *H04L 1/1829* (2013.01); *H04L 1/1858* (2013.01); *H04L 1/1819* (2013.01)
USPC ........... 370/329; 370/335; 370/342; 370/236; 370/252; 714/749; 714/750; 455/69; 455/450

(58) Field of Classification Search
USPC ................. 370/342, 343, 335–336, 328, 329; 375/219, 269; 714/748–750
See application file for complete search history.

(56) References Cited

U.S. PATENT DOCUMENTS

| | | | |
|---|---|---|---|
| 7,688,899 B2 | 3/2010 | Ketchum et al. | |
| 7,995,615 B2 * | 8/2011 | Yang et al. | 370/479 |
| 8,050,357 B2 * | 11/2011 | Clerckx et al. | 375/299 |
| 8,107,426 B2 * | 1/2012 | Cho et al. | 370/329 |
| 2003/0133452 A1 | 7/2003 | Su | |
| 2005/0195732 A1 * | 9/2005 | Huh et al. | 370/206 |

(Continued)

FOREIGN PATENT DOCUMENTS

| | | |
|---|---|---|
| CN | 101242384 A | 8/2008 |
| EP | 1398928 A1 | 3/2004 |

(Continued)

OTHER PUBLICATIONS

International Search Report—PCT/US2009/057907, International Search Authority—European Patent Office—Jun. 4, 2010.

(Continued)

*Primary Examiner* — Candal Elpenord
(74) *Attorney, Agent, or Firm* — Liem T. Do

(57) ABSTRACT

A method and apparatus reducing overhead usage associated with communications is provided. The method may comprise generating an acknowledgment (ACK) for a successfully received codeword from a group of codewords or a negative acknowledgement (NACK) for a codeword unsuccessfully received from the group of codewords, and populating a response information matrix with a plurality of response information elements, wherein the response information elements are determined as a function of the generated acknowledgement or negative acknowledgements.

66 Claims, 7 Drawing Sheets

(56) References Cited

U.S. PATENT DOCUMENTS

| | | | |
|---|---|---|---|
| 2007/0136633 A1* | 6/2007 | Lee et al. | 714/748 |
| 2007/0195974 A1* | 8/2007 | Li et al. | 381/94.3 |
| 2007/0260956 A1* | 11/2007 | Terry et al. | 714/748 |
| 2008/0084843 A1 | 4/2008 | Gorokhov et al. | |
| 2008/0165873 A1 | 7/2008 | Ghosh et al. | |
| 2009/0196204 A1* | 8/2009 | Astely et al. | 370/280 |
| 2009/0207793 A1 | 8/2009 | Shen et al. | |
| 2009/0262856 A1* | 10/2009 | Onggosanusi et al. | 375/267 |

FOREIGN PATENT DOCUMENTS

| | | |
|---|---|---|
| EP | 1971096 A2 | 9/2008 |
| EP | 2045948 A2 | 4/2009 |
| TW | I231678 B | 4/2005 |
| TW | I262682 B | 9/2006 |
| WO | WO2007145487 A2 | 12/2007 |
| WO | WO2008007927 A2 | 1/2008 |
| WO | WO2008041033 A1 | 4/2008 |
| WO | WO2008041089 | 4/2008 |
| WO | WO2008041932 | 4/2008 |
| WO | WO2008042904 | 4/2008 |
| WO | WO2008053074 A1 | 5/2008 |
| WO | WO2008120925 A1 | 10/2008 |

OTHER PUBLICATIONS

LG Electronics: "Bundled ACK/NACK in TDD" 3GPP Draft; R1-081815 TDD ACKNACK Bundling, 3rd Generation Partnership Project (3GPP), Mobile Competence Centre ; 650, Route Des Lucioles ; F-06921 Sophia-Antipolis Cedex ; France, vol. RAN WG1, No. Kansas City, USA; May 14, 2008, XP050110191.

Nokia Siemens Networks et al: "UL control signalling to support bandwidth extension in LTE Advanced" 3GPP Draft; R1-090234, 3rd Generation Partnership Project (3GPP), Mobile Competence Centre ; 650, Route Des Lucioles ; F-06921 Sophia-Antipolis Cedex—France, No. Ljubljana; Jan. 7, 2009, XP050318163 [retrieved on Jan. 7, 2009].

Nokia Siemens Networks et al: "UL control signalling to support bandwidth extension in LTE Advanced" 3GPP Draft; R1-090724, 3rd Generation Partnership Project (3GPP), Mobile Competence Centre ; 650, Route Des Lucioles ; F-06921 Sophia-Antipolis Cedex ; France, No. Athens, Greece; Feb. 3, 2009, XP050318591 [retrieved on Feb. 3, 2009].

Texas Instruments: "ACK/NAK DTX Detection with ACK/NAK Bundling in TDD" 3GPP Draft; R1-081985, 3rd Generation Partnership Project (3GPP), Mobile Competence Centre; 650, Route Des Lucioles; F-06921 Sophia-Antipolis Cedex; France, [Online] vol. RAN WG1, No. Kansas City, USA; Apr. 29, 2008, XP002549274.

ZTE: "ACK/NAK bundling transmission in PUCCH considering DTX in TDD" 3GPP Draft; R1-081769 ACKNAK Bundling Transmission in PUCCH Considering DTX in TDD, 3RD Generation Partnership Project (3GPP), Mobile Competence Centre ; 650, Route Des Lucioles ; F-06921 Sophia-Antipolis Cedex ; France, vol. RAN WG1, No. Kansas City, USA; May 14, 2008, XP050110152.

ZTE: "PUCCH resource region for LTE-A" 3GPP Draft; R1-091421 PUCCH Resource Region for LTE-A, 3RD Generation Partnership Project (3GPP), Mobile Competence Centre ; 650, Route Des Lucioles ; F-06921 Sophia-Antipolis Cedex—France, No. Seoul, Korea; Mar. 17, 2009, XP050339001 [retrieved on Mar. 17, 2009].

Written Opinion—PCT/US2009/057907—ISA/EPO—Apr. 6, 2010.

* cited by examiner

APPARATUS AND METHOD FOR REDUCING OVERHEAD FOR COMMUNICATIONS

CLAIM OF PRIORITY UNDER 35 U.S.C. §119

The present application for patent claims priority to Provisional Application No. 61/099,029 entitled "ACK Bundling in a Wireless Communication System" filed Sep. 22, 2008, and assigned to the assignee hereof and hereby expressly incorporated by reference herein.

BACKGROUND

1. Field

The present application relates generally to wireless communications, and more specifically to methods and systems for reducing overhead usage associated communications.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min \{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

Generally, during hybrid automatic repeat request (HARQ) communications, acknowledgements (ACKs) are transmitted by a wireless communications device (WCD) for each successfully received codeword and negative acknowledgements (NACKs) are transmitted by the WCD for each unsuccessfully received codeword. As the number of codewords that may be communicated increases, the overhead resources used for HARQ communications also increases, thereby possibly limiting codeword communication capacity and/or slowing down communications.

Thus, improved apparatus and methods for reducing overhead usage associated with communications are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with reducing overhead usage associated with communications. According to one aspect, a method for reducing overhead usage associated with communications is provided. The method can comprise generating an acknowledgment (ACK) for a successfully received codeword from a group of codewords or a negative acknowledgement (NACK) for a codeword unsuccessfully received from the group of codewords. Moreover, the method can comprise populating a response information matrix with a plurality of response information elements, wherein the response information elements are determined as a function of the generated acknowledgement or negative acknowledgement.

Still another aspect relates to a computer program product comprising a computer-readable medium. The computer-readable medium can include code for causing a computer to generate an acknowledgment (ACK) for a successfully received codeword from a group of codewords or a negative acknowledgement (NACK) for a codeword unsuccessfully received from the group of codewords. Moreover, the computer-readable medium can include code for causing the computer to populate a response information matrix with a plurality of response information elements, wherein the response information elements are determined as a function of the generated acknowledgement or negative acknowledgement.

Yet another aspect relates to an apparatus. The apparatus can include means for generating an acknowledgment (ACK) for a successfully received codeword from a group of codewords or a negative acknowledgement (NACK) for a codeword unsuccessfully received from the group of codewords. Moreover, the apparatus can comprise means for populating a response information matrix with a plurality of response information elements, wherein the response information elements are determined as a function of the generated acknowledgement or negative acknowledgement.

Another aspect relates to an apparatus. The apparatus can include a response information module for generating an acknowledgment (ACK) for a successfully received codeword from a group of codewords or a negative acknowledgement (NACK) for a codeword unsuccessfully received from the group of codewords. Moreover, the apparatus response information module may be further operable for populating a response information matrix with a plurality of response information elements, wherein the response information elements are determined as a function of the generated acknowledgement or negative acknowledgement.

Furthermore, in accordance with one or more aspects and corresponding disclosure thereof, various aspects are described in connection with processing reduced overhead communications. According to one aspect, a method for processing reduced overhead communications is provided. The method can comprise processing a response information matrix associated with a group of codewords, wherein the response information matrix includes a plurality of response information elements determined as a function of one or more acknowledgements or negative acknowledgements, generated by a wireless communications device (WCD), for successfully or unsuccessfully received codewords from the group of codewords. Moreover, the method can comprise determining if any codewords from the group of codewords were unsuccessfully received.

Still another aspect relates to a computer program product comprising a computer-readable medium. The computer-readable medium can include code for causing a computer to process a response information matrix associated with a group of codewords, wherein the response information matrix includes a plurality of response information elements determined as a function of one or more acknowledgements or negative acknowledgements, generated by a wireless communications device (WCD), for successfully or unsuccessfully received codewords from the group of codewords. Moreover, the computer-readable medium can include code for causing the computer to determine if any codewords from the group of codewords were unsuccessfully received.

Yet another aspect relates to an apparatus. The apparatus can include means for processing a response information matrix associated with a group of codewords, wherein the response information matrix includes a plurality of response information elements determined as a function of one or more acknowledgements or negative acknowledgements, generated by a wireless communications device (WCD), for successfully or unsuccessfully received codewords from the group of codewords. Moreover, the apparatus can comprise means for determining if any codewords from the group of codewords were unsuccessfully received.

Another aspect relates to an apparatus. The apparatus can include a response information module operable for processing a response information matrix associated with a group of codewords, wherein the response information matrix includes a plurality of response information elements determined as a function of one or more acknowledgements or negative acknowledgements, generated by a wireless communications device (WCD), for successfully or unsuccessfully received codewords from the group of codewords. Moreover, the apparatus response information module may be further operable for determining if any codewords from the group of codewords were unsuccessfully received.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, during communications between devices, acknowledgements (ACKs) are transmitted for successfully received codewords and negative acknowledgements (NACKs) are transmitted for unsuccessfully received codeword. As the number of codewords that may be communicated increases, the overhead resources used for communicating ACK/NACKs also increases. By way of example and in not limitation, a wireless communications device (WCD) that supports MIMO operation (e.g., 8-by-8 MIMO operation) may utilize MIMO communications that have more than 2 codewords. However, existing HARQ ACK/NACK communication formats are designed for only up to 2 codewords. Accordingly, various techniques for supporting communications in such a case are described herein.

Figure 1:
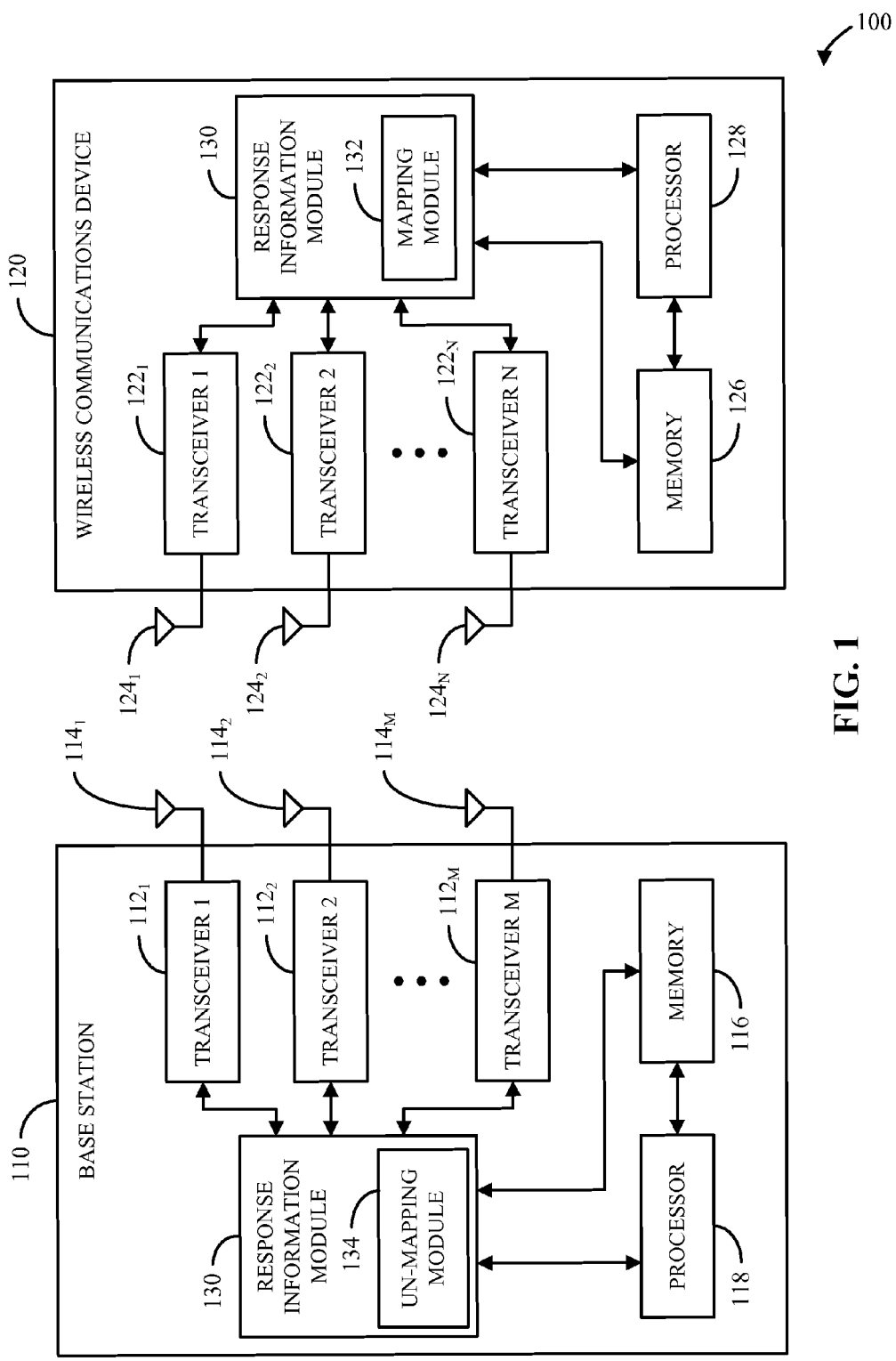
FIG. 1 illustrates a block diagram of a system for structuring and conducting an communications in a wireless communication system according to an aspect.

With reference now to FIG. 1, a block diagram of a system 100 for structuring and conducting an ACK transmission as part of a HARQ communication process in a wireless communication system is illustrated. System 100 may include one or more base stations 110 and one or more wireless communications device (e.g. terminals) 120, which can communicate via respective antennas 114 and 124. In one aspect, base station 110 may function as an E-NodeB. In one aspect, base station 110 may conduct a downlink (DL) communication to terminal 120 via transceivers 112 and antennas 114. At the terminal 120, the DL communication may be received via antennas 124 and transceivers 122. In one aspect, the DL communication information may include a group of codewords. Thereafter, information communicated from base station 110 to terminal 120 may then be analyzed by a response information module 130. In another aspect, terminal 120 may conduct an uplink (UL) communication to base station 110 via transceivers 122 and antennas 124. At the base station 110, the UL communication may be received via antennas 114 and transceivers 112. In one aspect, the UL communication information may include a group of codewords. Thereafter, information communicated from terminal 120 to base station 120 may then be analyzed by a response information module 130.

Response information module 130 may include a mapping module 132 and/or other suitable modules to generate ACK/NACKs corresponding to one or more codewords utilized for the DL communication in accordance with various aspects described above. In one aspect, the mapping module 132 may be operable to reduce overhead of acknowledgements for different codewords by populating a response information matrix with response information elements derived as a function of the generated ACK/NACKs. By way of example and not limitation, a communication scheme may be utilized with N codewords and K bits reserved as information response elements for indication of acknowledgement, where $K \leq N$. In such an exemplary aspect, mapping module 132 may define a function from a set S, $\{0,1\}^N$, of size $2^N$ to a set A of all K-bit binary words. In another aspect, mapping module 132 may adaptively change a mapping function over time provided the WCD 120 and base station 110 are aware of such changes. In such an aspect, the WCD 120 may be informed of a mapping in a predetermined manner, additionally or in the alternative mapping may be conveyed to the WCD through a signaling mechanism. In one aspect, WCD 120 can additionally include a memory 126 and/or processor 128, which can be operable to implement various aspects described herein. In yet another aspect, mapping can be a function of: assigning of codewords to corresponding antenna ports, MCS selected for different codewords, layers of codeword transmission, etc.

In one aspect, the generated mapped ACK information can then be transmitted in an uplink (UL) communication to base station 110 via transceivers 122 and antennas 124. In one aspect, wireless communication system 100 may use LTE and/or a similar technology, LTE formats 1, 1A, and/or 1B for transmission of the mapped ACK/NACKs. For example, BPSK may be used to transmit a 1-bit ACK while QPSK may be used to transmit a 2-bit ACK. In one aspect, similar mapping schemes may be used that leverages other modulation formats, such as 16-QAM, 64-QAM, or the like, to support more ACK/NACK bits. In another aspect, Physical Uplink Control Channel (PUCCH) resources reserved for format 2 may be used to transmit mapped ACK/NACKs, as resources reserved for format 2 can accommodate more bits than resources reserved for format 1 or similar formats. In a further aspect, multiple PUCCH resources within a subframe may be reserved for mapped ACK/NACKs with additional ACK/NACK bits. Based on this reservation, a WCD 120 may use these multiple PUCCH resources to transmit mapped HARQ bits. For example, different reserved resources can be used to convey different mapped ACK/NACKs bits. Still further, in such an aspect, the multiple resources may be reserved as described above as different sequences within a PUCCH resource block (RB.) Additionally or in the alternative, reserved resources may include resources across PUCCH RBs that are contiguous in frequency. In such an aspect, WCD 120 may transmit using a SC-FDMA waveform. As an additional and/or another alternative aspect, resources across different PUCCH RBs can be utilized. In such an aspect, since the RBs may not be contiguous in frequency, a WCD may transmit using NxSCFDMA or OFDMA. Still further, in another aspect, resources across different PUCCH subframes may be used. Moreover, resources in Physical Uplink Shared Channel (PUSCH) may also be used to transmit mapped ACK/NACKs. In such an aspect, a transmission may use multiple SC-FDMA symbols and/or a technique such as NxSCFDMA or OFDMA.

Figure 2:
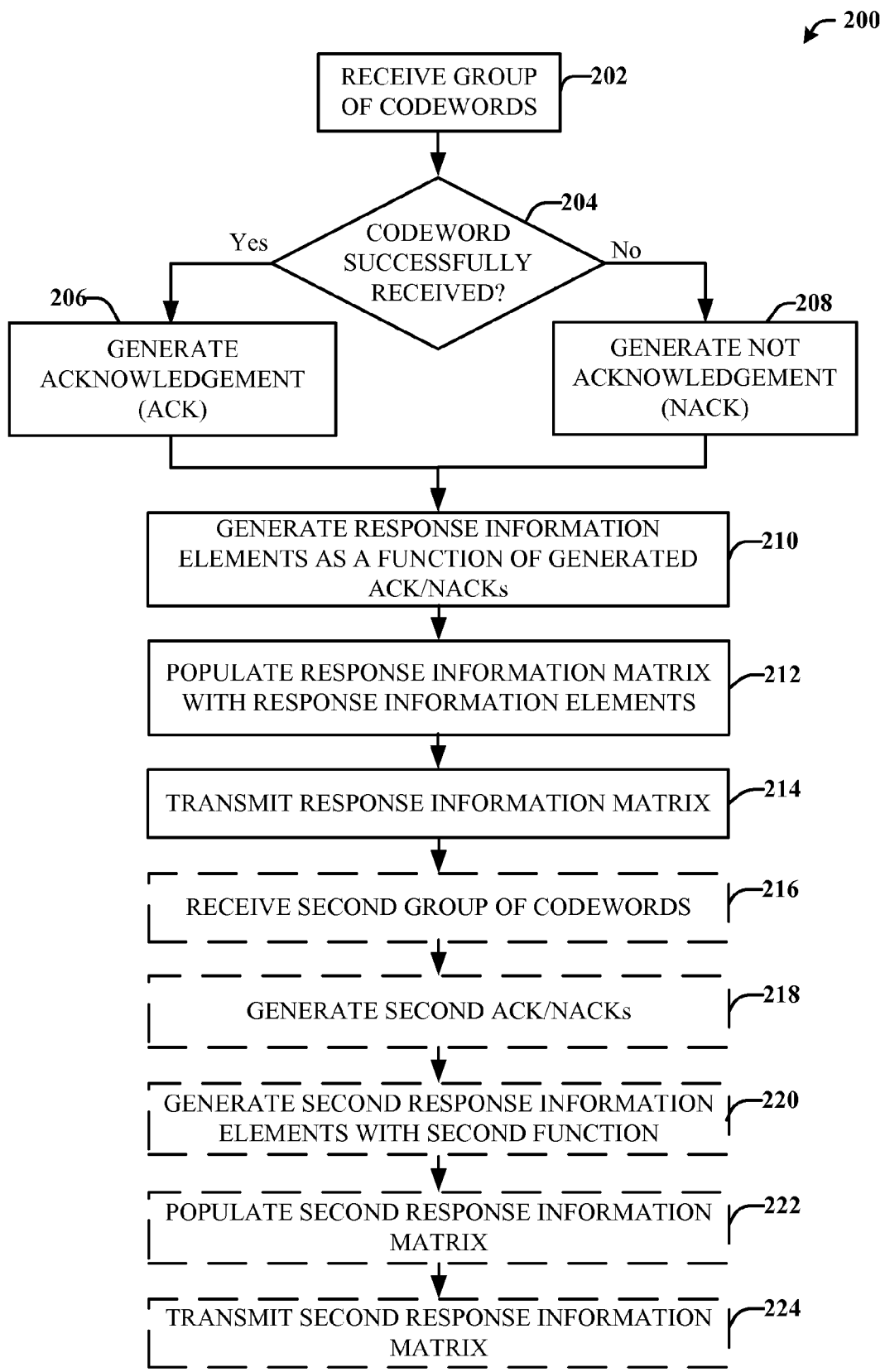
FIG. 2 depicts an exemplary flow diagram of a methodology for reducing overhead usage associated with communications according to an aspect.

In addition, base station 110 can include a response information module 130, un-mapping module 134, memory 116, and/or processor 118 to generate and facilitate communication of ACK information as generally described with respect to terminal 120. In one aspect, un-mapping module 134 may be operable to process a received response information matrix and determine which transmitted codewords were successfully and/or unsuccessfully received. In such an aspect, un-mapping module 134 may process the function agreed upon between the base station 110 and WCD 120 to derive information associated with the transmitted codewords. In response to the un-mapped information, base station 110 may conduct subsequent DL communications to terminal 120 via transceivers 112 and antennas 114. In one aspect, base station 110 may configure a number of maximum codewords per WCD 120 based on various parameters such as WCD 120 capabilities and radio conditions. In such an aspect, configuration for a WCD 120 may be conveyed to the WCD 120 by a high layer mechanism and/or message FIG. 2 illustrates various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 2, exemplary method 200 for reducing overhead usage associated with communications is illustrated. Generally, at reference numeral 202 a group of codewords is received. In one aspect, the number of codewords in a group of codewords may be determined by the number of communication channels available in a wireless communications device (WCD). In another aspect, the group of codewords may be received in multiple layers. In such an aspect, the group of codewords may include multiple codewords that may be spatially multiplexed with each codeword consisting of multiple layers. In another aspect, the group of codewords may include multiple codewords that may be from different carriers. As such, a group of codewords may be received in a multicarrier setup where codewords may be defined across different carriers. At reference numeral 204, it is determined whether a codeword of the group of codewords is successfully received. In one aspect, each of the codewords in the group of code words is processed. In another aspect, codewords may be sequentially processed. In one such an aspect, codewords may be transmitted in layers such that subsequent codeword processing depends on successful processing of previous codewords.

If it is determined at reference numeral 204 that the codeword was successfully received, then at reference numeral 206 an acknowledgement (ACK) is generated. By contrast, if at reference numeral 204, it is determined that the codeword was unsuccessfully received, then at reference numeral 208 a negative acknowledgment (NACK) is generated.

At reference numeral 210, response information elements are generated as a function of the generated ACK/NACKs. In one aspect, the function may map multiple generated ACK/NACKs to each response information element, wherein each response information element value indicates a success status for the mapped elements. In still another aspect, the function may map multiple generated ACK/NACKs to multiple response information elements, wherein the multiple response information element values indicate a success status for the mapped ACKs or NACKs through a predetermined indexing structure. In yet another aspect, the function may further include mapping the generated ACK/NACKs based on a number of transmission layers and a format in which the multiple layers are received. Moreover, in another aspect, the function may map generated ACK/NACKs based on: a number of codewords in the group of codewords, a number of attempted transmissions of at least a portion of the codewords in the group of codewords, a response received from a previously transmitted response information matrix, etc.

At reference 212, a response information matrix may be populated with the generated response information elements. In one aspect, the response information matrix may use: a 1-bit binary phase shift key (BPSK) format, a 2-bit quadrature phase shift key (QPSK) format, a 16-bit quadrature amplitude modulation (QAM) format, or a 64-bit QAM format, etc. At reference numeral 214, the response information matrix may be transmitted to the base station from which the group of codewords was received at reference numeral 202. In one aspect, the transmitting may further include transmitting using: a Physical Uplink Control Channel (PUCCH), or a Physical Uplink Shared Channel (PUSCH), etc. In another aspect, the transmitting may further include reserving multiple PUCCH resources for the response information matrix. In such an aspect, the multiple PUCCH resources include may include: multiple sequences within a PUCCH resource block, multiple sequences across PUCCH resource blocks with contiguous frequencies within a subframe, multiple sequences across PUCCH resource blocks with non-contiguous frequencies within a subframe, or multiple sequences across PUCCH subframes.

In one aspect, in response to the received response information matrix, a second group of codewords may be received from the base station at reference numeral 216. In one such aspect, only codewords which were not successfully received previously are re-transmitted. In another aspect, unsuccessfully previously received codewords associated with a bundling, indexing, grouping, etc., as determined by the function used, are retransmitted. In such an aspect, at reference numeral 218, ACK/NACKs are generated, such as in reference numerals 204-208, for the second group of codewords. At reference numeral 220, second response information elements may be generated as using a second function of the generated ACK/NACKs. In one aspect, the second function may differ from the function used for the previously received group of codewords. In such an aspect, the second function may provide further refined response information through using refined bundling, indexing, grouping, etc., to map the generated ACK/NACKs to second response information elements. At reference 222, a second response information matrix may be populated with the generated second response information elements. At reference numeral 224, the second response information matrix may be transmitted to the base station from which the second group of codewords was received at reference numeral 216.

Figure 3:
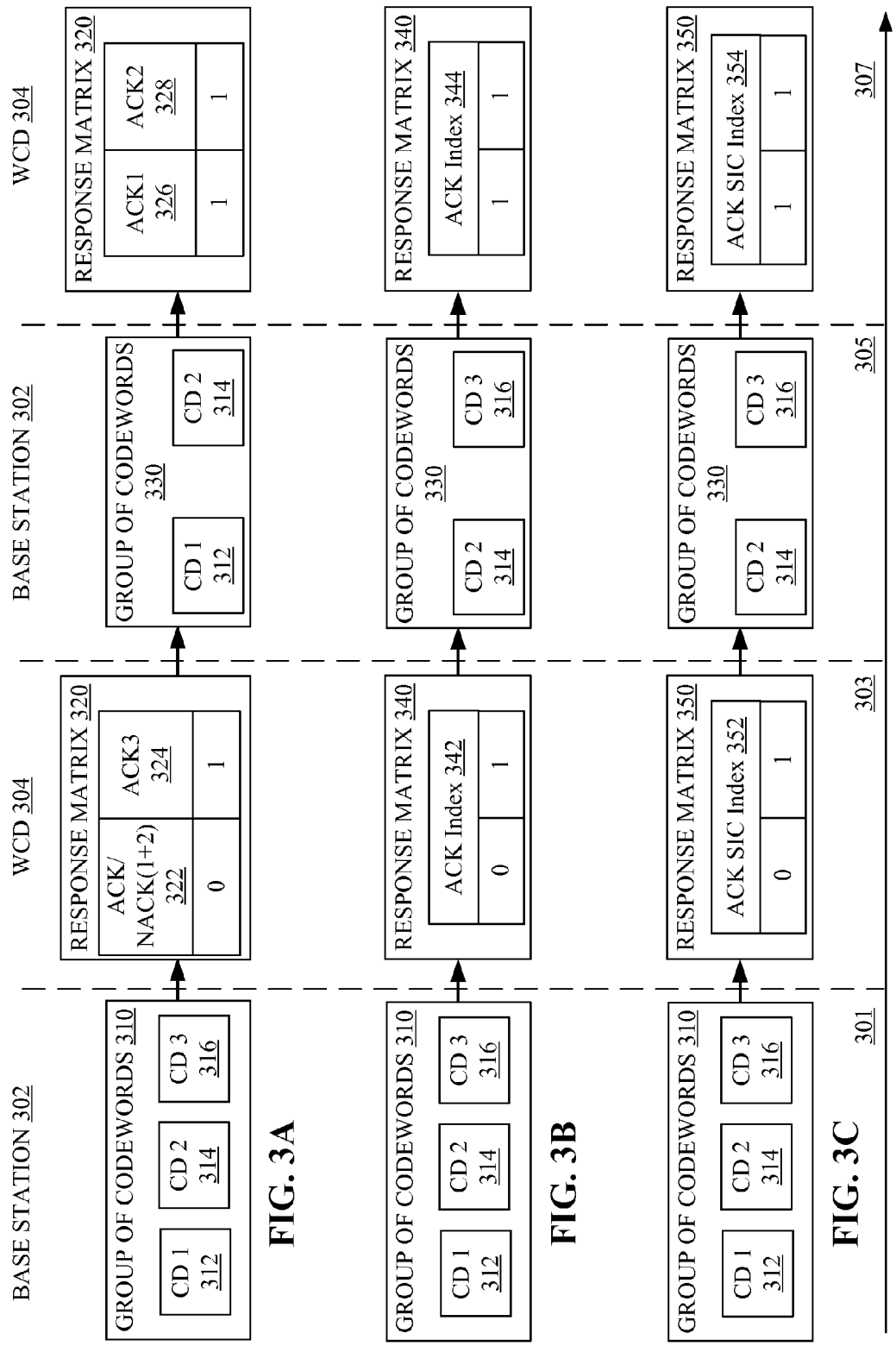
FIG. 3A depicts an exemplary flow diagram for reducing overhead usage associated with communications according to an aspect.
FIG. 3B depicts an exemplary flow diagram for reducing overhead usage associated with communications according to another aspect.
FIG. 3C depicts an exemplary flow diagram for reducing overhead usage associated with communications according to yet another aspect.

Turning now to FIGS. 3A, 3B and 3C, an exemplary flow diagram of a methodology for reducing overhead usage associated with communications is illustrated as time 309 progresses, as indicated by the left-to-right arrow. In the depicted aspects, at time interval 301, a base station 302 may transmit a group of codewords 310 to a WCD 304. Further, at time interval 303, WCD 304 may process the received group of codewords 310 and generate a response information matrix (320, 340, 350) which may associate, through a function, ACK/NACKs for each of the received codewords (312, 314, 316) with response information elements as part of the response information matrix (320, 340, 350). For illustrative purposes, and not as a limitation, it is assumed that the WCD 304 determines that CD2 was unsuccessfully received; thereby resulting in a NACK being generated is response to CD2. At time interval 305, base station 302 may process the response matrix and in response may retransmit any unsuccessfully transmitted codewords. At time interval 307, WCD 304 may process any retransmitted codewords and provide a second response using a response information matrix (320, 340, 350). Turning now to the specific exemplary aspect depicted in FIGS. 3A, 3B and 3C. FIG. 3A depicts an aspect in which a response matrix 320 bundles codewords from the received group of codewords, as is described with reference to exemplary Table 1. FIG. 3B depicts an aspect in which a response matrix is populated with indices representing successful receipt of any of the group of codewords, as is described with reference to exemplary Table 2. FIG. 3C depicts an aspect in which a response matrix is populated with indices based on a successive interference cancellation (SIC) representation of successful receipt of any of the group of codewords, as is described with reference to exemplary Table 3. Further, although the exemplary aspect depicted in FIGS. 3A, 3B and 3C describe use of a two element response matrix (320, 340, 350), one of ordinary skill in the art would understand the concepts may be applicable to any size response matrix.

With reference to FIG. 3A, at time interval 301, a group of codewords 310 includes codewords, CD1 312, CD2 314 and CD3 316, may be transmitted to WCD 304. At time interval 303, WCD 304 may process the received codewords and determine which of the group of codewords has been successfully received. In the depicted example, WCD 304 determined CD2 314 was not successfully received. Further in the depicted example, CD1 312 and CD2 314 have been bundled together to generate a response element to populate the response matrix. As such, the first response element 322 provides an indication that at least one of the codewords associated with response element 322 was not successfully received (e.g. a "0"). Response element 324 is mapped to CD3 316, and in the depicted exemplary aspect, CD3 316 has been successfully received. As such, the second response information element 324 provides an indication that CD3 was successfully received (e.g. a "1"). Thereafter, response matrix 320 is populated with response information elements 322 and 324. With respect to the depicted aspect, the following Table 1 is provided to illustrate how information elements are determined as a function of bundled ACK/NACKs.

TABLE 1

| Response Information Matrix (320) | Associated ACK/NACK representation |
|---|---|
| (0, 0) | No codewords were successfully received |
| (0, 1) | At least one of CD1 or CD2 was not successfully received |
| (1, 0) | CD3 was not successfully received |
| (1, 1) | All codewords were successfully received |

At time interval 305, base station 302 receives the response matrix 320 and may determine that at least one of the codewords associated with response element 322 was not successfully received. In response to un-mapping the response element 322, base station 302 may re-transmit CD1 and CD2 as a second group of codewords. In the depicted aspect, at time interval 307, WCD 304 may generate response elements (326, 328) indicting the re-transmitted codewords have been successfully received. In one aspect, a function used to bundle codewords may be dynamic and may change in response to multiple factors, such as, the number of times a codeword or group of codewords has been transmitted, the number of layers in the codeword transmission, etc.

With reference to FIG. 3B, at time interval 301, a group of codewords 310 includes codewords, CD1 312, CD2 314 and CD3 316, may be transmitted to WCD 304. At time interval 303, WCD 304 may process the received codewords and determine which of the group of codewords has been successfully received. In the depicted example, WCD 304 determined CD2 314 was not successfully received. Further in the depicted example, an index 342 indicating one of the first two received codewords was not successfully received may be used to populate the response matrix 340. With respect to the depicted aspect, the following Table 2 is provided to illustrate how an indexing system may be used to describe how information elements are determined as a function of ACK/NACKs.

TABLE 2

| Response Information Matrix (340) | Associated ACK/NACK representation |
|---|---|
| (0, 0) | No codewords were successfully received |
| (0, 1) | At least one of the first two codewords was not successfully received |
| (1, 0) | At least one of the last two codewords was not successfully received |
| (1, 1) | All codewords were successfully received |

At time interval 305, base station 302 receives the response matrix 340 and may determine, in the depicted aspect, that at least one of the first two transmitted codewords was not successfully received. In response to analyzing the index values 342, base station 302 may re-transmit CD1 and CD2 as a second group of codewords. In the depicted aspect, at time interval 307, WCD 304 may populate response matrix 340 with an index (1,1) 344 indicting all the re-transmitted codewords have been successfully received. In one aspect, a function used to describe received codewords through an index may be dynamic and may change in response to multiple factors, such as, the number of times a codeword or group of codewords has been transmitted, the number of layers in the codeword transmission, etc.

With reference to FIG. 3C, at time interval 301, a group of codewords 310 includes codewords, CD1 312, CD2 314 and CD3 316, may be transmitted to WCD 304. At time interval 303, WCD 304 may process the received codewords and determine which of the group of codewords has been successfully received. In the depicted example, WCD 304 determined CD2 314 was not successfully received. Further, in the depicted aspect, a successive interference cancellation (SIC) codeword processing system may be used, wherein codewords may be sequentially processed (e.g. decoded) and their associated signal subtracted from the total received signal before attempting to decode the next codeword. In such an aspect, if a codeword is not successfully received, then the signal associated with that codeword may not be subtracted from the total signal and therefore subsequent codewords may not be processed. Still further in the depicted example, a SIC index 352 indicating that CD1 was successfully received but CD2 and therefore CD3 were not successfully received may be used to populate the response matrix 350. With respect to the depicted aspect, the following Table 3 is provided to illustrate how an SIC indexing system may be used to describe how information elements are determined as a function of ACK/NACKs.

TABLE 3

| Response Information Matrix (350) | Associated ACK/NACK representation |
|---|---|
| (0, 0) | No codewords were successfully received |
| (0, 1) | CD1 was successfully received but CD2 and CD3 were not |
| (1, 0) | CD1 and CD2 were successfully received but CD3 was not |
| (1, 1) | All codewords were successfully received |

At time interval 305, base station 302 receives the response matrix 350 and may determine, in the depicted aspect, that CD2 and CD3 were not successfully received. In response to analyzing the index values 352, base station 302 may re-transmit CD2 and CD3 as a second group of codewords. In the depicted aspect, at time interval 307, WCD 304 may populate response matrix 350 with an SIC index (1,1) 354 indicating all the re-transmitted codewords have been successfully received. In one aspect, a function used to describe received codewords through an index may be dynamic and may change in response to multiple factors, such as, the number of times a codeword or group of codewords has been transmitted, the number of layers in the codeword transmission, etc.

Figure 4:
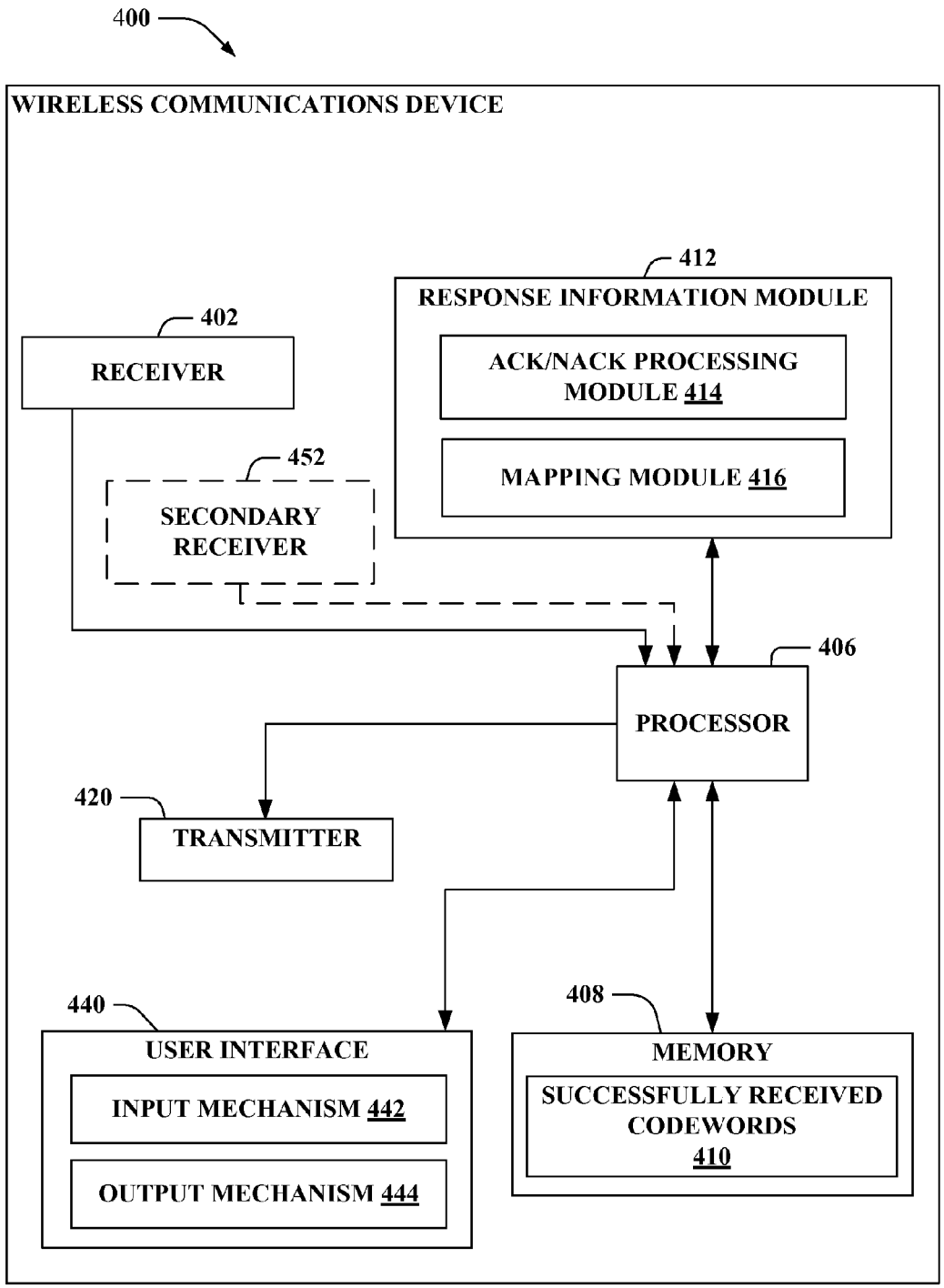
FIG. 4 depicts a block diagram of an exemplary wireless communications device that can reduce overhead usage associated with communications according to an aspect.

With reference now to FIG. 4, an illustration of a wireless communications device 400 (e.g. a client device) that reducing overhead usage associated with communications is presented. Client device 400 comprises receiver 402 that receives one or more signal from, for instance, one or more receive antennas (not shown), performs typical actions on (e.g., filters, amplifies, downconverts, etc.) the received signal, and digitizes the conditioned signal to obtain samples. Receiver 402 can comprise an oscillator that can provide a carrier frequency for demodulation of the received signal and a demodulator that can demodulate received symbols and provide them to processor 406 for channel estimation. In one aspect, client device 400 may further comprise secondary receiver 452 and may receive additional channels of information.

Processor 406 can be a processor dedicated to analyzing information received by receiver 402 and/or generating information for transmission by one or more transmitters 420 (for ease of illustration, only one transmitter is shown), a processor that controls one or more components of client device 400, and/or a processor that both analyzes information received by receiver 402 and/or receiver 452, generates information for transmission by transmitter 420 for transmission on one or more transmitting antennas (not shown), and controls one or more components of client device 400.

Client device 400 can additionally comprise memory 408 that is operatively coupled to processor 406 and that can store data to be transmitted, received data, information related to available channels, data associated with analyzed signal and/or interference strength, information related to an assigned channel, power, rate, or the like, and any other suitable information for estimating a channel and communicating via the channel. Memory 408 can additionally store protocols and/or algorithms associated with estimating and/or utilizing a channel (e.g., performance based, capacity based, etc.). In one aspect, memory may include successfully received codewords 410. In such an aspect, successfully received codewords 410 may include a portion of codewords transmitted as a group of codewords.

It will be appreciated that the data store (e.g., memory 408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 408 of the subject systems and methods is intended to comprise, without being limited to, these and any other suitable types of memory.

Client device 400 can further comprise response information module 412 to reduce overhead usage associated with communications. Response information module 412 may further include ACK/NACK processing module 414 to process received codewords from a group of codewords to determine if the transmitted codewords have been successfully received. Response information module 412 may further include mapping module 416 to populate a response information matrix with response information elements derived as a function of the processed ACK/NACKs. In one aspect, mapping module 416 may determine the function with reference to the receiver architecture of the WCD 400, the channel structure of the WCD 400, and/or other WCD 400 properties. By way of example and not limitation, a communication scheme may be utilized with N codewords and K response information element bits of a response information matrix reserved for indication of acknowledgement, where K≤N. In such an exemplary aspect, mapping module 416 may define a function from a set S, $\{0,1\}^N$, of size $2^N$ to a set A of all K-bit binary words. In one aspect, the response information matrix may use: a 1-bit binary phase shift key (BPSK) format, a 2-bit quadrature phase shift key (QPSK) format, a 16-bit quadrature amplitude modulation (QAM) format, or a 64-bit QAM format, etc. In another aspect, a function may map multiple processed ACK/NACKs to each response information element, wherein each response information element value indicates a success status for the mapped ACK/NACKs. In still another aspect, a function may map multiple processed ACK/NACKs to multiple response information elements, wherein the multiple response information element values indicate a success status for the mapped elements. In yet another aspect, a function may further include mapping the processed ACK/NACKs based on a number of transmission layers and a format in which the multiple layers are received. In such an aspect, for example, multiple codewords may be spatially multiplexed with each code word consisting of multiple layers. Moreover, in another aspect, a function may map generated ACK/NACKs based on: a number of codewords in the group of codewords, a number of attempted transmissions of at least a portion of the codewords in the group of codewords, a response received from a previously transmitted response information matrix, etc.

Additionally, mobile device 400 may include user interface 440. User interface 440 may include input mechanisms 442 for generating inputs into wireless device 400, and output mechanism 442 for generating information for consumption by the user of wireless device 400. For example, input mechanism 442 may include a mechanism such as a key or keyboard, a mouse, a touch-screen display, a microphone, etc. Further, for example, output mechanism 444 may include a display, an audio speaker, a haptic feedback mechanism, a Personal Area Network (PAN) transceiver etc. In the illustrated aspects, output mechanism 444 may include a display operable to present media content that is in image or video format or an audio speaker to present media content that is in an audio format.

Figure 5:
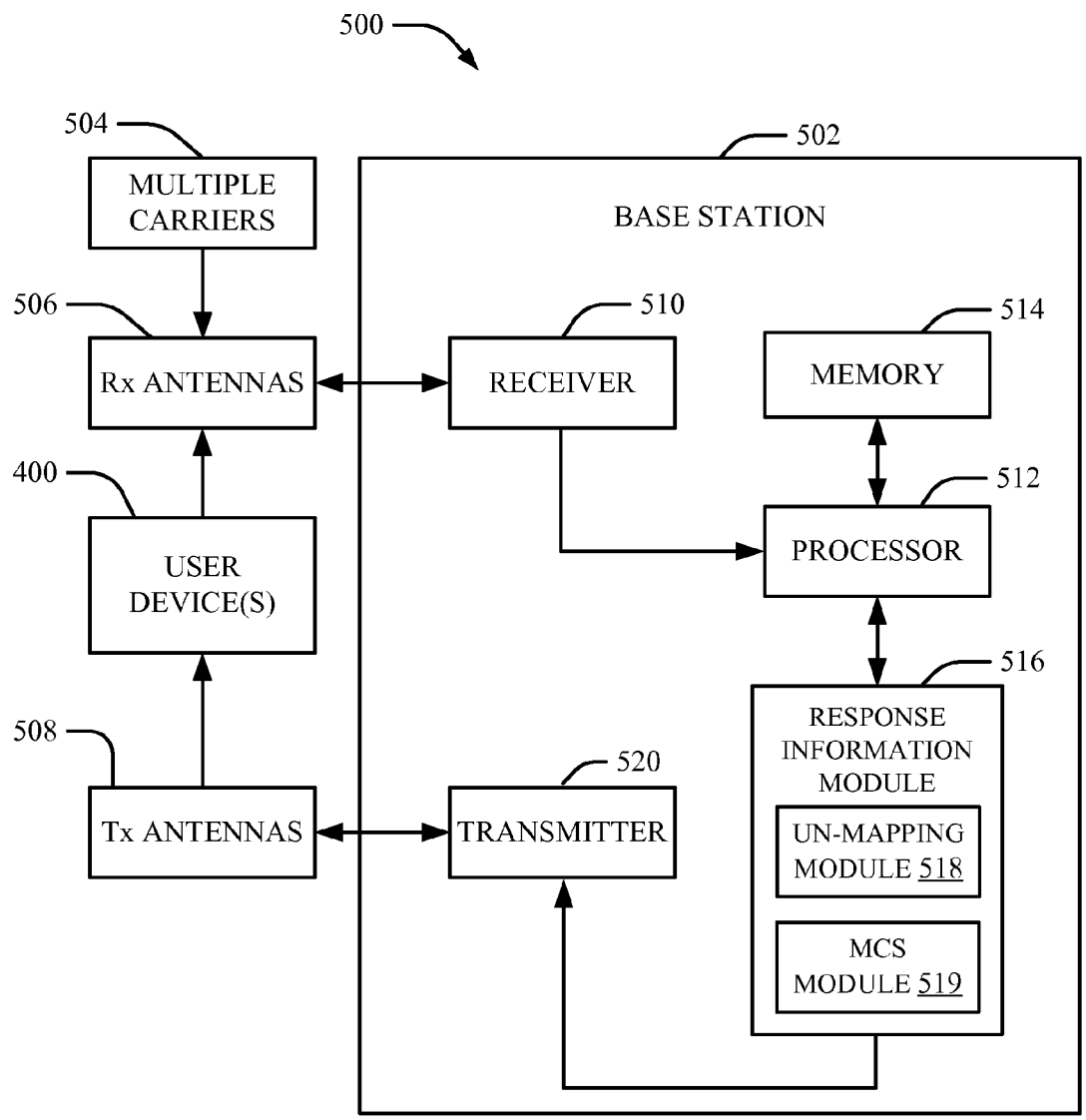
FIG. 5 is a block diagram depicting the architecture of a base station configured to process reduced overhead communications, according to another aspect herein described.

With reference to FIG. 5, an example system 500 that comprises a base station 502 with a receiver 510 that receives signal(s) from one or more user devices 400 and or more or more carriers 504, through a plurality of receive antennas 506, and a transmitter 520 that transmits to the one or more user devices 400 through a plurality of transmit antennas 508. Receiver 510 can receive information from receive antennas 506. Symbols may be analyzed by a processor 512 that is similar to the processor described above, and which is coupled to a memory 514 that stores information related to wireless data processing. Processor 512 is further coupled to a response information module 516 that facilitates processing reduced overhead communications associated with one or more respective user devices 400. In one aspect, codeword may be received from multiple carriers 504. In another aspect, response information module 516 may process a response information matrix associated with a group of codewords previously transmitted from the base station 500. In such an aspect, the response information matrix may include a plurality of response information elements determined as a function of one or more acknowledgements or negative acknowledgements, generated by a wireless communications device (WCD), for successfully or unsuccessfully received codewords from the group of previously transmitted codewords. In another aspect, response information module 516 further include modulation code scheme (MCS) module 519 operable for selecting a modulation format and a coding rate scheme, to be used for transmitting a codeword and/or a group of codewords. In one such aspect of system 500, the selected MCS may be based on the function used un-mapping module 518 in processing ACK/NACKs. For example, as depicted in FIG. 3A, a mapping function processes of group of codewords, e.g. three codewords, by bundling two codewords (a first and a second codeword) and leaving another codeword (a third codeword) unbundled. In such an exemplary aspect, the third codeword may be selected to remain unbundled and the MCS of the third codeword could be selected such that it is more likely to be successfully transmitted on the first transmission. Likewise, the first two codewords may be bundled and the MCS of the first two codewords could be selected such that they are more likely to be successfully transmitted by the second transmission, at which time independent ACK bits are likely to be available for the two codewords. As such, mapping may be used to reduce the number of times successfully received codewords are retransmitted.

Signals may be multiplexed and/or prepared for transmission by a transmitter 520 through one or more transmit antennas 508 to user devices 400. Response information module 516 may further include un-mapping module 518. In one aspect, un-mapping module 518 may define the mapping function used by the WCD. In such an aspect, un-mapping module 518 may use knowledge of channel parameters, receiver structure, and/or other WCD properties in determining what mapping function to use. In one aspect, un-mapping module 518 may be operable to determine which transmitted codewords were successfully and/or unsuccessfully received by device 400. In such an aspect, un-mapping module 518 may process a function agreed upon between the base station 502 and WCD 400 to derive information associated with the transmitted codewords. In response to the un-mapped information, base station 500 may conduct subsequent DL communications to terminal 400 via transmitter 520 and transmit antennas 508.

Figure 6:
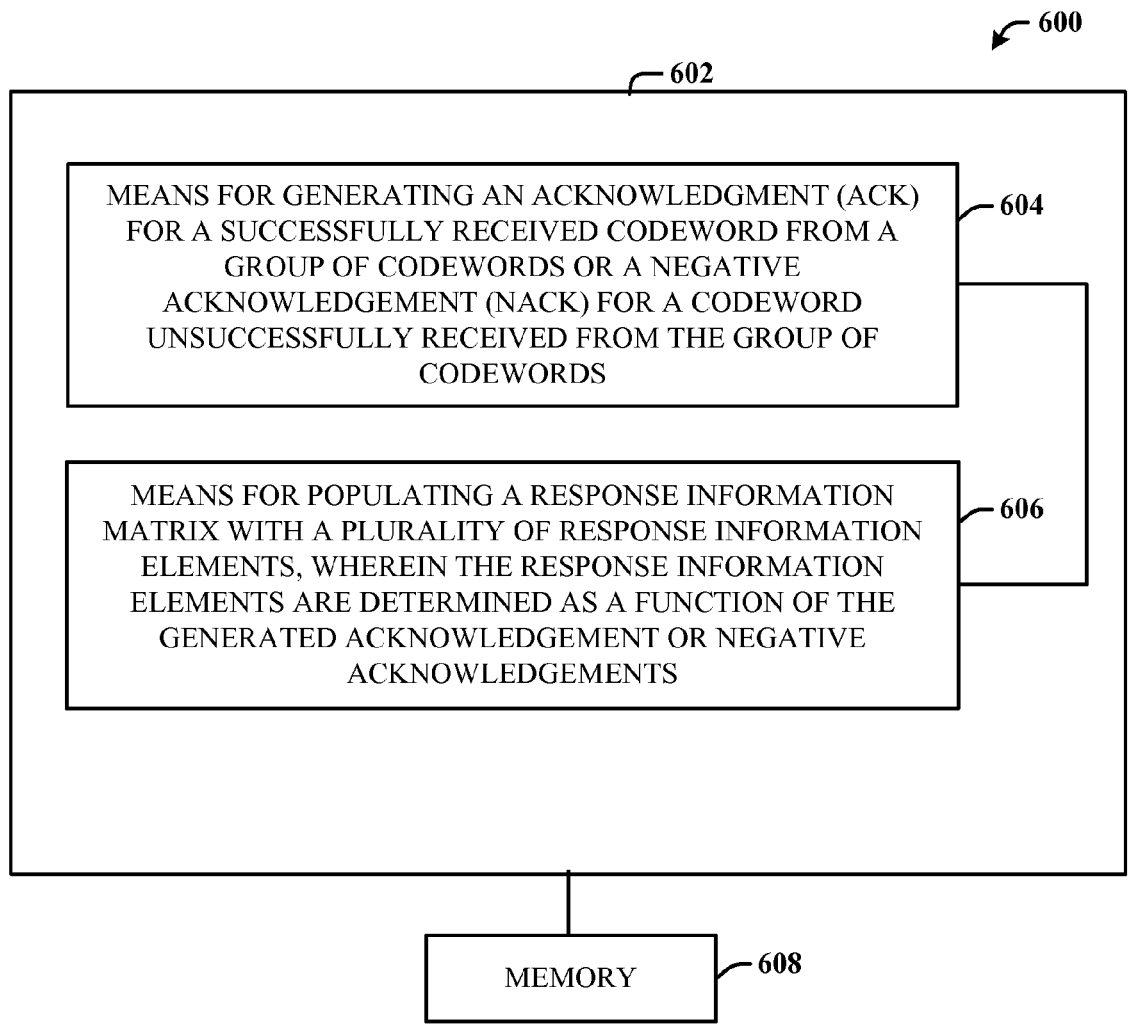
FIG. 6 depicts a block diagram of an exemplary communication system that can reduce overhead usage associated with communications according to an aspect.

With reference to FIG. 6, a block diagram of an exemplary system 600 that can reduce overhead usage associated with communications is illustrated. For example, system 600 can reside at least partially within a wireless device. According to another example aspect, system 600 can reside at least partially within an access terminal. It is to be appreciated that system 600 is represented as including functional blocks, which can be functional blocks that represent functions implemented by a processor, software, or combination thereof (e.g., firmware). System 600 includes a logical grouping 602 of means that can act in conjunction. For instance, logical grouping 602 can include means for generating an acknowledgment (ACK) for a successfully received codeword from a group of codewords or a negative acknowledgement (NACK) for a codeword unsuccessfully received from the group of codewords 604. In one aspect, the number of codewords in a group of codewords may be determined by the number of communication channels available in a wireless communications device. In another aspect, the group of codewords may be received in multiple layers.

Further, logical grouping 602 can comprise means for populating a response information matrix with a plurality of response information elements, wherein the response information elements are determined as a function of the generated acknowledgement or negative acknowledgements 606. In one aspect, the response information matrix may use: a 1-bit binary phase shift key (BPSK) format, a 2-bit quadrature phase shift key (QPSK) format, a 16-bit quadrature amplitude modulation (QAM) format, or a 64-bit QAM format, etc. In another aspect, the function may map multiple generated ACK/NACKs to each response information element, wherein each response information element value indicates a success status for the mapped elements. In still another aspect, the function may map multiple generated ACK/NACKs to multiple response information elements, wherein the multiple response information element values indicate a success status for the mapped elements. In yet another aspect, the function may further include mapping the generated ACK/NACKs based on a number of transmission layers and a format in which the multiple layers are received. Moreover, in another aspect, the function may map generated ACK/NACKs based on: a number of codewords in the group of codewords, a number of attempted transmissions of at least a portion of the codewords in the group of codewords, a response received from a previously transmitted response information matrix, etc.

Additionally, system 600 can include a memory 608 that retains instructions for executing functions associated with the means 604 and 606. While shown as being external to memory 612, it is to be understood that one or more of the means 604, and 606 can exist within memory 608.

Figure 7:
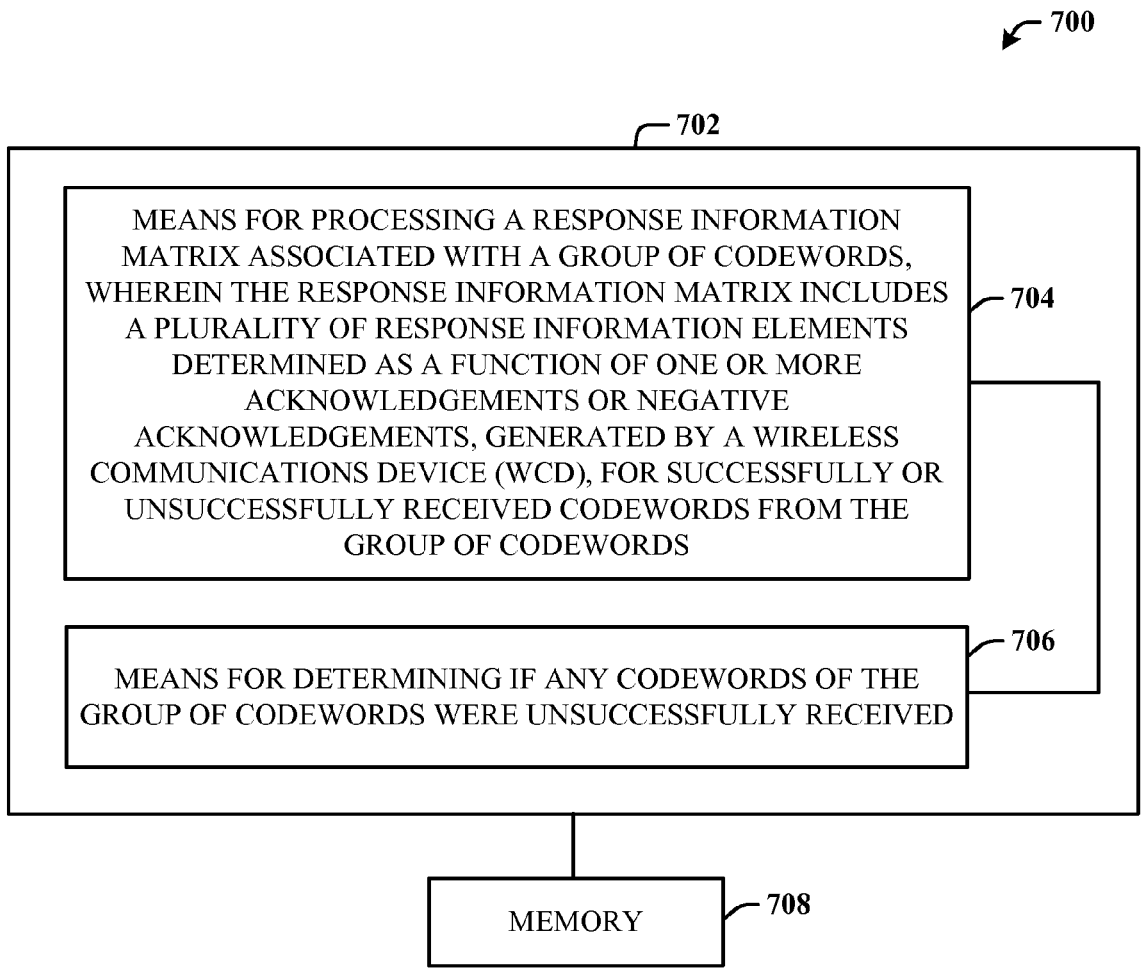
FIG. 7 depicts a block diagram of an exemplary communication system that can process reduced overhead communications according to an aspect.

With reference to FIG. 7, a block diagram of an exemplary system 700 that can process reduced overhead HARQ communications is illustrated. For example, system 700 can reside at least partially within a base station, E-NodeB, etc. According to another example aspect, system 700 can reside at least partially within an access terminal. It is to be appreciated that system 700 is represented as including functional blocks, which can be functional blocks that represent functions implemented by a processor, software, or combination thereof (e.g., firmware). System 700 includes a logical grouping 702 of means that can act in conjunction. For instance, logical grouping 702 can include means for processing a response information matrix associated with a group of codewords, wherein the response information matrix includes a plurality of response information elements determined as a function of one or more acknowledgements or negative acknowledgements, generated by a wireless communications device (WCD), for successfully or unsuccessfully received codewords from the group of codewords 704. In one aspect, the number of codewords in a group of codewords may be determined by the number of communication channels available in the base station. In another aspect, the group of codewords may be transmitted using multiple layers. In one aspect, the response information matrix may use: a 1-bit binary phase shift key (BPSK) format, a 2-bit quadrature phase shift key (QPSK) format, a 16-bit quadrature amplitude modulation (QAM) format, or a 64-bit QAM format, etc. In another aspect, the function may un-map multiple generated ACK/NACKs to each response information element, wherein each response information element value indicates a success status for the mapped elements. In still another aspect, the function may un-map multiple generated ACK/NACKs to multiple response information elements, wherein the multiple response information element values indicate a success status for the mapped elements. In yet another aspect, the function may further include un-mapping the generated ACK/NACKs based on a number of transmission layers and a format in which the multiple layers are received by the WCD. Moreover, in another aspect, the function may un-map generated ACK/NACKs based on: a number of codewords in the group of codewords, a number of attempted transmissions of at least a portion of the codewords in the group of codewords, a response received from a previously received response information matrix, etc.

Further, logical grouping 702 can comprise means for determining if any codewords of the group of codewords were unsuccessfully received 706. In one aspect, upon a determination that at least one of the group of codewords was unsuccessfully transmitted, the at least one unsuccessfully received codeword may be transmitted again. In such an aspect, the base station may receive a second response information matrix, wherein the second response information matrix includes a plurality of second response information elements determined as a second function of acknowledgement and negative acknowledgement elements, generated by a wireless communications device (WCD), for successfully and unsuccessfully received codewords from the at least one unsuccessfully received codeword.

Additionally, system 700 can include a memory 708 that retains instructions for executing functions associated with the means 704 and 706. While shown as being external to memory 708, it is to be understood that one or more of the means 704 and 706 can exist within memory 708.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 4" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of reducing overhead usage associated with communications, the method comprising:
generating an acknowledgment (ACK) for a successfully received codeword from a group of codewords or a negative acknowledgement (NACK) for a codeword unsuccessfully received from the group of codewords; and
populating a response information matrix with a plurality of response information elements, wherein the response information elements are determined as a function of the acknowledgement or the negative acknowledgement generated after receiving the successfully received codeword or the unsuccessfully received codeword;
wherein the function further includes mapping the generated ACK or NACK based on a number of codewords in the group of codewords or a number of attempted transmissions of at least a portion of the codewords in the group of codewords;
wherein the number of codewords in the group of codewords is determined by a number of communication channels available for a wireless communications device.

2. The method of claim 1, further comprising:
receiving, by a wireless communications device, the group of codewords from a base station; and
transmitting the response information matrix to the base station.

3. The method of claim 1, further comprising:
transmitting, by a wireless communications device, the group of codewords to a base station; and
receiving the response information matrix from the base station.

4. The method of claim 1, wherein the function further includes mapping multiple generated ACKs or NACKs to each response information element, wherein each response information element value indicates a success status for a bundled set of the mapped ACKs or NACKs.

5. The method of claim 1, wherein the function further includes mapping multiple generated ACKs or NACKs to multiple response information elements, wherein the multiple response information element values indicate a success status for the mapped ACKs or NACKs through a predetermined indexing structure.

6. The method of claim 1, wherein the receiving further comprises receiving the group of codewords using multiple layers; and
wherein the function further includes mapping the generated ACKs or NACKs based on the number of layers for each codeword and a format in which the multiple layers are received.

7. The method of claim 1, wherein the response information matrix uses at least one of: a 1-bit binary phase shift key (BPSK) format, a 2-bit quadrature phase shift key (QPSK) format, a 16-bit quadrature amplitude modulation (QAM) format, or a 64-bit QAM format.

8. The method of claim 2, wherein the transmitting includes transmitting using at least one of: a Physical Uplink Control Channel (PUCCH), or a Physical Uplink Shared Channel (PUSCH).

9. The method of claim 2, wherein the transmitting further comprises:
reserving multiple PUCCH resources for the response information matrix, wherein the multiple PUCCH resources include at least one of:
multiple sequences within a PUCCH resource block,
multiple sequences across PUCCH resource blocks with contiguous frequencies within a subframe,
multiple sequences across PUCCH resource blocks with non-contiguous frequencies within a subframe, or
multiple sequences across PUCCH subframes.

10. The method of claim 2, wherein the receiving further comprises:
receiving the group of codewords from multiple carriers.

11. A computer program product, comprising:
a non-transitory computer-readable storage medium comprising:
code for causing a computer to generate an acknowledgment (ACK) for a successfully received codeword from a group of codewords or a negative acknowledgement (NACK) for a codeword unsuccessfully received from the group of codewords; and
code for causing the computer to populate a response information matrix with a plurality of response information elements, wherein the response information elements are determined as a function of the acknowledgement or the negative acknowledgement generated after receiving the successfully received codeword or the unsuccessfully received codeword;
wherein the function further includes mapping the generated ACK or NACK based on a number of codewords in the group of codewords or a number of attempted transmissions of at least a portion of the codewords in the group of codewords;
wherein the number of codewords in the group of codewords is determined by a number of communication channels available for a wireless communications device.

12. The computer program product of claim 11, wherein the computer-readable storage medium further comprises code for causing the computer to:
map multiple generated ACKs or NACKs to each response information element, wherein each response information element value indicates a success status for a bundled set of the mapped ACKs or NACKs.

13. The computer program product of claim 11, wherein the computer-readable storage medium further comprises code for causing the computer to:
map multiple generated ACKs or NACKs to multiple response information elements, wherein the multiple response information element values indicate a success status for the mapped ACKs or NACKs through a predetermined indexing structure.

14. The computer program product of claim 11, wherein the computer-readable storage medium further comprises code for causing the computer to:
receive the group of codewords using multiple layers; and
map the generated ACKs or NACKs based on the number of layers for each codeword and a format in which the multiple layers are received.

15. The computer program product of claim 11, wherein the computer-readable storage medium further comprises code for causing the computer to:

format the response information matrix using at least one of: a 1-bit binary phase shift key (BPSK) format, a 2-bit quadrature phase shift key (QPSK) format, a 16-bit quadrature amplitude modulation (QAM) format, or a 64-bit QAM format.

16. An apparatus, comprising:

means for generating an acknowledgment (ACK) for a successfully received codeword from a group of codewords or a negative acknowledgement (NACK) for a codeword unsuccessfully received from the group of codewords; and means for populating a response information matrix with a plurality of response information or the negative acknowledgement generated after receiving the successfully received codeword or the unsuccessfully received codeword;

wherein the function further includes mapping the generated ACK or NACK based on a number of codewords in the group of codewords or a number of attempted transmissions of at least a portion of the codewords in the group of codewords;

wherein the number of codewords in the group of codewords is determined by a number of communication channels available for a wireless communications device.

17. The apparatus of claim 16, further comprising:

means for receiving, by a wireless communications device, the group of codewords from a base station; and means for transmitting the response information matrix to the base station.

18. The apparatus of claim 16, further comprising:

means for transmitting, by a wireless communications device, the group of codewords to a base station; and means for receiving the response information matrix from the base station.

19. The apparatus of claim 16, wherein the means for populating further comprises:

means for mapping multiple generated ACKs or NACKs to each response information element, wherein each response information element value indicates a success status for a bundled set of the mapped ACKs or NACKs.

20. The apparatus of claim 16, wherein the means for populating further comprises:

means for mapping multiple generated ACKs or NACKs to multiple response information elements, wherein the multiple response information element values indicate a success status for the mapped ACKs or NACKs through a predetermined indexing structure.

21. The apparatus of claim 16, further comprising:

means for receiving the group of codewords using multiple layers; and wherein the means for populating further comprises:

means for mapping the generated ACKs or NACKs based on the number of layers for each codeword and a format in which the multiple layers are received.

22. The apparatus of claim 17, wherein the means for transmitting further comprises:

means for transmitting using at least one of: a Physical Uplink Control Channel (PUCCH), or a Physical Uplink Shared Channel (PUSCH).

23. The apparatus of claim 17, wherein the means for transmitting further comprises:

means for reserving multiple PUCCH resources for the response information matrix, wherein the multiple PUCCH resources include at least one of:

multiple sequences within a PUCCH resource block, multiple sequences across PUCCH resource blocks with contiguous frequencies within a subframe, multiple sequences across PUCCH resource blocks with non-contiguous frequencies within a subframe, or multiple sequences across PUCCH subframes.

24. The apparatus of claim 17, wherein the means for receiving further comprises:

means for receiving the group of codewords from multiple carriers.

25. A wireless communications device (WCD), comprising:

a memory; and a response information module coupled the memory and operable for:

generating an acknowledgment (ACK) for a successfully received codeword from a group of codewords or a negative acknowledgement (NACK) for a codeword unsuccessfully received from the group of codewords; and populating a response information matrix with a plurality of response information elements, wherein the response information elements are determined as a function of acknowledgement or the negative acknowledgement generated after receiving the successfully received codeword or the unsuccessfully received codeword;

wherein the function further includes mapping the generated ACK or NACK based on a number of codewords in the group of codewords or a number of attempted transmissions of at least a portion of the codewords in the group of codewords;

wherein the number of codewords in the group of codewords is determined by a number of communication channels available for the WCD.

26. The WCD of claim 25, further comprising:

a transceiver module operable for:

receiving the group of codewords from a base station; and transmitting the response information matrix to the base station.

27. The WCD of claim 25, further comprising:

a transceiver module operable for:

transmitting, by a wireless communications device, the group of codewords to a base station; and receiving the response information matrix from the base station.

28. The WCD of claim 25, wherein the response information module is further operable for:

mapping multiple generated ACKs or NACKs to each response information element, wherein each response information element value indicates a success status for a bundled set of the mapped ACKs or NACKs.

29. The WCD of claim 25, wherein the response information module is further operable for:

mapping multiple generated ACKs or NACKs to multiple response information elements, wherein the multiple response information element values indicate a success status for the mapped ACKs or NACKs through a predetermined indexing structure.

30. The WCD of claim 25, further comprising a transceiver module operable for receiving the group of codewords using multiple layers, and
wherein the response information module is further operable for mapping the generated ACKs or NACKs based on the number of layers for each codeword and a format in which the multiple layers are received.

31. The WCD of claim 25, wherein the response information matrix uses at least one of: a 1-bit binary phase shift key (BPSK) format, a 2-bit quadrature phase shift key (QPSK) format, a 16-bit quadrature amplitude modulation (QAM) format, or a 64-bit QAM format.

32. The WCD of claim 26, wherein the transceiver is further operable for:
transmitting using at least one of: a Physical Uplink Control Channel (PUCCH), or a Physical Uplink Shared Channel (PUSCH).

33. The WCD of claim 26, wherein the transceiver module is further operable for:
reserving multiple PUCCH resources for the response information matrix, wherein the multiple PUCCH resources include at least one of:
multiple sequences within a PUCCH resource block,
multiple sequences across PUCCH resource blocks with contiguous frequencies within a subframe,
multiple sequences across PUCCH resource blocks with non-contiguous frequencies within a subframe, or
multiple sequences across PUCCH subframes.

34. The WCD of claim 26, wherein the transceiver module is further operable for:
receiving the group of codewords from multiple carriers.

35. A method for processing reduced overhead communications, the method comprising:
processing a response information matrix associated with a group of codewords, wherein the response information matrix includes a plurality of response information elements determined as a function of one or more acknowledgements or negative acknowledgements, the plurality of response information elements generated by a wireless communications device (WCD) after receiving the one or more acknowledgements or negative acknowledgements, for successfully or unsuccessfully received codewords from the group of codewords; and
determining if any codewords from the group of codewords were unsuccessfully received;
wherein the function further includes mapping the generated ACK or NACK based on a number of codewords in the group of codewords or a number of attempted transmissions of at least a portion of the codewords in the group of codewords;
wherein the number of codewords in the group of codewords is determined by a number of communication channels available for the WCD.

36. The method of claim 35, further comprising:
determining a modulation format and coding rate scheme to use for transmitting each codeword of the group of codewords, wherein the modulation format and coding rate scheme depending on the function used for mapping the one or more acknowledgements or negative acknowledgements to the plurality of response information elements.

37. The method of claim 35, further comprising:
upon a determination that at least one of the codewords from the group of codewords was unsuccessfully received, transmitting the at least one unsuccessfully received codeword; and
receiving a second response information matrix, wherein the second response information matrix includes a plurality of second response information elements determined as a second function of acknowledgements or negative acknowledgements, generated by the WCD, for successfully or unsuccessfully received codewords from the at least one unsuccessfully received codeword.

38. The method of claim 35, wherein the function further includes un-mapping multiple generated ACKs or NACKs to each response information element, wherein each response information element value indicates a success status for a bundled set of the mapped ACKs or NACKs.

39. The method of claim 35, wherein the function further includes un-mapping multiple generated ACKs or NACKs to multiple response information elements, wherein the multiple response information element values indicate a success status for the mapped ACKs or NACKs through a predetermined indexing structure.

40. The method of claim 35, wherein the transmitting further comprises transmitting the group of codewords using multiple layers; and
wherein the function includes un-mapping the generated ACKs or NACKs based on the number of layers for each codeword and a format in which the multiple layers are received by the WCD.

41. The method of claim 35, further comprising:
receiving the response information matrix uses at least one of: a 1-bit binary phase shift key (BPSK) format, a 2-bit quadrature phase shift key (QPSK) format, a 16-bit quadrature amplitude modulation (QAM) format, or a 64-bit QAM format.

42. The method of claim 35, further comprising:
receiving the group of codewords from multiple carriers; and
transmitting the group of codewords from the multiple carriers to the WCD.

43. A computer program product, comprising:
a non-transitory computer-readable storage medium comprising:
code for causing the computer to process a response information matrix associated with a group of codewords, wherein the response information matrix includes a plurality of response information elements determined as a function of one or more acknowledgements or negative acknowledgements, the plurality of response information elements generated by a wireless communications device (WCD) after receiving the one or more acknowledgements or negative acknowledgements, for successfully or unsuccessfully received codewords from the group of codewords; and
code for causing the computer to determine if any codewords from the group of codewords were unsuccessfully received;
wherein the function further includes mapping the generated ACK or NACK based on a number of codewords in the group of codewords or a number of attempted transmissions of at least a portion of the codewords in the group of codewords;
wherein the number of codewords in the group of codewords is determined by a number of communication channels available for the WCD.

44. The computer program product of claim 43, wherein the computer-readable storage medium further comprises code for causing the computer to:
determine a modulation format and coding rate scheme to use for transmitting each codeword of the group of codewords, wherein the modulation format and coding rate scheme depending on the function used for mapping the one or more acknowledgements or negative acknowledgements to the plurality of response information elements.

45. The computer program product of claim 43, wherein the computer-readable storage medium further comprises code for causing the computer to:
transmit at least one unsuccessfully received codeword upon a determination that the at least one of the codewords from the group of codewords was unsuccessfully received; and
receive a second response information matrix, wherein the second response information matrix includes a plurality of second response information elements determined as a second function of acknowledgements or negative acknowledgements, generated by the WCD, for successfully or unsuccessfully received codewords from the at least one unsuccessfully received codeword.

46. The computer program product of claim 43, wherein the computer-readable storage medium further comprises code for causing the computer to:
un-map multiple generated ACKs or NACKs to each response information element, wherein each response information element value indicates a success status for a bundled set of the mapped ACKs or NACKs.

47. The computer program product of claim 43, wherein the computer-readable storage medium further comprises code for causing the computer to:
un-map multiple generated ACKs or NACKs to multiple response information elements, wherein the multiple response information element values indicate a success status for the mapped ACKs or NACKs through a predetermined indexing structure.

48. The computer program product of claim 43, wherein the computer-readable storage medium further comprises code for causing the computer to:
transmit the group of codewords using multiple layers; and
un-map the generated ACKs or NACKs based on the number of layers for each codeword and a format in which the multiple layers are received by the WCD.

49. The computer program product of claim 43, wherein the computer-readable storage medium further comprises code for causing the computer to:
receive the response information matrix uses at least one of: a 1-bit binary phase shift key (BPSK) format, a 2-bit quadrature phase shift key (QPSK) format, a 16-bit quadrature amplitude modulation (QAM) format, or a 64-bit QAM format.

50. An apparatus, comprising:
means for processing a response information matrix associated with a group of codewords, wherein the response information matrix includes a plurality of response information elements determined as a function of one or more acknowledgements or negative acknowledgements, the plurality of response information elements generated by a wireless communications device (WCD) after receiving the one or more acknowledgements or negative acknowledgements, for successfully or unsuccessfully received codewords from the group of codewords; and
means for determining if any codewords from the group of codewords were unsuccessfully received;
wherein the function further includes mapping the generated ACK or NACK based on a number of codewords in the group of codewords or a number of attempted transmissions of at least a portion of the codewords in the group of codewords;
wherein the number of codewords in the group of codewords is determined by a numbed of communication channels available for the WCD.

51. The apparatus of claim 50, further comprising:
means for determining a modulation format and coding rate scheme to use for transmitting each codeword of the group of codewords, wherein the modulation format and coding rate scheme depending on the function used for mapping the one or more acknowledgements or negative acknowledgements to the plurality of response information elements.

52. The apparatus of claim 50, further comprising:
means for transmitting at least one unsuccessfully received codeword upon a determination that the at least one of the codewords from the group of codewords was unsuccessfully received; and
means for receiving a second response information matrix, wherein the second response information matrix includes a plurality of second response information elements determined as a second function of acknowledgements or negative acknowledgements, generated by the WCD, for successfully or unsuccessfully received codewords from the at least one unsuccessfully received codeword.

53. The apparatus of claim 50, wherein the means for processing further comprises:
means for un-mapping multiple generated ACKs or NACKs to each response information element, wherein each response information element value indicates a success status for a bundled set of the mapped ACKs or NACKs.

54. The apparatus of claim 50, wherein the means for processing further comprises:
means for un-mapping multiple generated ACKs or NACKs to multiple response information elements, wherein the multiple response information element values indicate a success status for the mapped ACKs or NACKs through a predetermined indexing structure.

55. The apparatus of claim 50, further comprising:
means for transmitting the group of codewords using multiple layers; and
wherein the means for processing further comprises:
means for un-mapping the generated ACKs or NACKs based on the number of layers for each codeword and a format in which the multiple layers are received by the WCD.

56. The apparatus of claim 50, further comprising:
means for receiving the response information matrix uses at least one of: a 1-bit binary phase shift key (BPSK) format, a 2-bit quadrature phase shift key (QPSK) format, a 16-bit quadrature amplitude modulation (QAM) format, or a 64-bit QAM format.

57. The apparatus of claim 50, further comprising:
means for receiving the group of codewords from multiple carriers; and
means for transmitting the group of codewords from the multiple carriers to the WCD.

58. A base station, comprising:
a memory; and a response information module coupled the memory and operable for:
processing a response information matrix associated with a group of codewords wherein the response information matrix includes a plurality of response information elements determined as a function of one or more acknowledgements or negative acknowledgements, the plurality of response information elements generated by a wireless communications device (WCD) after receiving the one or more acknowledgements or negative acknowledgements, for successfully or unsuccessfully received codewords from the group of codewords; and determining if any codewords from the group of codewords were unsuccessfully received;

wherein the function further includes mapping the generated ACK or NACK based on a number of codewords in the group of codewords or a number of attempted transmissions of at least a portion of the codewords in the group of codewords;

wherein the number of codewords in the group of codewords is determined by a number of communication channels available for the WCD.

59. The base station of claim 58, wherein the response information module is further operable for:

determining a modulation format and coding rate scheme to use for transmitting each codeword of the group of codewords, wherein the modulation format and coding rate scheme depending on the function used for mapping the one or more acknowledgements or negative acknowledgements to the plurality of response information elements.

60. The base station of claim 58, further comprising:

a transceiver module operable for:

transmitting at least one unsuccessfully received codeword upon a determination that the at least one of the codewords from the group of codewords was unsuccessfully received; and receiving a second response information matrix; and wherein the response information module is further operable for:

processing the second response information matrix, wherein the second response information matrix includes a plurality of second response information elements determined as a second function of acknowledgements or negative acknowledgements, generated by the WCD, for successfully or unsuccessfully received codewords from the at least one unsuccessfully received codeword.

61. The base station of claim 58, wherein the response information module is further operable for:

un-mapping multiple generated ACKs or NACKs to each response information element, wherein each response information element value indicates a success status for a bundled set of the mapped ACKs or NACKs.

62. The base station of claim 58, wherein the response information module is further operable for:

un-mapping multiple generated ACKs or NACKs to multiple response information elements, wherein the multiple response information element values indicate a success status for the mapped ACKs or NACKs through a predetermined indexing structure.

63. The base station of claim 58, further comprising a transceiver module operable for transmitting the group of codewords using multiple layers; and wherein the response information module is further operable for: un-mapping the generated ACKs or NACKs based on the number of layers for each codeword and a format in which the multiple layers are received by the WCD.

64. The base station of claim 58, further comprising a transceiver module operable for:

receiving the response information matrix uses at least one of: a 1-bit binary phase shift key (BPSK) format, a 2-bit quadrature phase shift key (QPSK) format, a 16-bit quadrature amplitude modulation (QAM) format, or a 64-bit QAM format.

65. The base station of claim 58, wherein the base station is an E-NodeB.

66. The base station of claim 58, further comprising a transceiver module operable for:

receiving the group of codewords from multiple carriers; and transmitting the group of codewords from the multiple carriers to the WCD.

* * * * *